(12) United States Patent
Andreae et al.

(10) Patent No.: US 8,505,712 B2
(45) Date of Patent: Aug. 13, 2013

(54) CONVEYOR-TO-CONVEYOR TRANSFER MECHANISM

(75) Inventors: Chad M. Andreae, Sturgeon Bay, WI (US); Anthony C. Scoville, Sturgeon Bay, WI (US)

(73) Assignee: SST Systems, Inc., Sturgeon Bay, WI (US)

( * ) Notice: Subject to any disclaimer, the term of this patent is extended or adjusted under 35 U.S.C. 154(b) by 0 days.

(21) Appl. No.: 12/933,998

(22) PCT Filed: Mar. 22, 2008

(86) PCT No.: PCT/US2008/003808
§ 371 (c)(1),
(2), (4) Date: Dec. 27, 2010

(87) PCT Pub. No.: WO2009/120163
PCT Pub. Date: Oct. 1, 2009

(65) Prior Publication Data
US 2011/0114449 A1    May 19, 2011

(51) Int. Cl.
*B65G 17/20* (2006.01)
(52) U.S. Cl.
USPC ............. 198/678.1; 198/576; 198/686
(58) Field of Classification Search
USPC ............ 198/678.1, 685, 686, 465.4, 575, 198/576
See application file for complete search history.

(56) References Cited

U.S. PATENT DOCUMENTS

| 2,344,155 | A |   | 3/1944  | McBride et al. |
|-----------|---|---|---------|----------------|
| 2,816,643 | A | * | 12/1957 | Klamp ................ 198/465.4 |
| 2,940,400 | A |   | 6/1960  | Harrison |
| 3,799,317 | A |   | 3/1974  | Shibata et al. |
| 4,838,036 | A | * | 6/1989  | Norrie ................. 62/63 |
| 5,433,154 | A | * | 7/1995  | Chwalik et al. ........ 104/172.4 |
| 5,806,657 | A | * | 9/1998  | Enderlein et al. ....... 198/680 |
| 5,927,472 | A | * | 7/1999  | Neef et al. ............ 198/465.4 |
| 6,341,686 | B1| * | 1/2002  | Beyer ................... 198/680 |
| 6,959,803 | B1|   | 11/2005 | Layne et al. |

OTHER PUBLICATIONS

PCT/US2008/003808 International Search Report and Written Opinion dated Jun. 25, 2008 (8 pages).

* cited by examiner

*Primary Examiner* — Gene Crawford
*Assistant Examiner* — Keith R Campbell
(74) *Attorney, Agent, or Firm* — Michael Best & Friedrich LLP (57) ABSTRACT

A conveyor-to-convey transfer mechanism is provided, and in some embodiments comprises a transfer conveyor extending between first and second conveyors for receiving items from the first conveyor and for dispatching the items to the second conveyor. In some embodiments, movement of items to the transfer conveyor comprises a convergence of a portion of the first conveyor with respect to the transfer conveyor and/or movement of items from the transfer conveyor comprises a divergence of a portion of the second conveyor with respect to the transfer conveyor. The convergence and/or divergence can include vertical change in the first, second and/or transfer conveyors, and can occur by supporting one portion of a bracket carrying an item upon at least one of the first and second conveyors, and supporting another portion of the bracket carrying the item upon the transfer conveyor.

20 Claims, 10 Drawing Sheets

CONVEYOR-TO-CONVEYOR TRANSFER MECHANISM

BACKGROUND

Conveyor systems for moving various items are commonly used in many industries, and often require significant capital investment for installation, operation, and maintenance. Significant challenges also exist in cases where changes to conveyor systems are necessary, such as to add one or more manufacturing operations to a product, to connect new conveyor system portions to an existing conveyor system, and the like.

In light of the costs and time often required to add to, modify, and/or design and install conveyor systems, advancements in such systems continue to be welcome in the art.

SUMMARY

In some embodiments, a transfer mechanism operable for transferring items from a first conveyor to a second conveyor is provided, and comprises: a third conveyor extending from a location adjacent the first conveyor to a location adjacent the second conveyor, the third conveyor having an upstream portion extending through a first range of positions extending in a first direction common to that of the first conveyor, at least some of the first range of positions also extending in a second direction converging with respect to the first conveyor, the first range of positions including a first transfer position at which items conveyed by the first conveyor are transferred to the third conveyor; and a downstream portion extending through a second range of positions extending in a third direction common to that of the second conveyor, at least some of the second range of positions also extending in a fourth direction diverging with respect to the second conveyor, the second range of positions including a second transfer position at which items conveyed by the third conveyor are transferred to the second conveyor; and a motor coupled to the third conveyor to move the third conveyor.

Some embodiments of the present invention provide a conveyor system comprising a first conveyor comprising a first rail and a first carriage coupled to the first rail for movement along the first rail; a second conveyor horizontally spaced from the first conveyor, the second conveyor comprising a second rail and a second carriage coupled to the second rail for movement along the second rail; a bracket adapted to support at least one item, the bracket movable along and supported by either of the first and second carriages of the first and second conveyors; and a third conveyor extending between the first and second conveyors, the third conveyor comprising a first portion extending adjacent and along a first path of the bracket moved by the first conveyor, and a second portion extending adjacent and along a path of the bracket moved by the second conveyor, wherein the first path horizontally converges with respect to the third conveyor and the second path horizontally diverges with respect to the third conveyor.

In some embodiments, a method of transferring at least one item from a first conveyor to a second conveyor is provided, and comprises: moving an item along a first conveyor toward a third conveyor; converging a portion of the first conveyor and an upstream portion of the third conveyor by changing elevation of at least one of the portion of the first conveyor and the upstream portion of the third conveyors; transferring the item from the first conveyor to the third conveyor; moving the item along the third conveyor; diverging a portion of the second conveyor and a downstream portion of the third conveyor by changing elevation of at least one of the portion of the second conveyor and the downstream portion of the third conveyors; and moving the item along the second conveyor.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

FIGS. 1-5 and 9 illustrate a first conveyor 10 including a first frame 12, a first rail 14, and one or more carriages 16. The carriages 16 can each include a hook, pin, protrusion, aperture or other portion capable of releasably holding a bracket 18. By way of example only, the illustrated carriages 16 each include a hook 16A from which a bracket 18 is suspended. The bracket 18 is operable to support one or more of a variety of items to be conveyed. The illustrated items being conveyed are panels 20 each supported by a bracket 18, which itself is coupled to a respective carriage 16. A first motor 22 can be coupled to the first conveyor 10 to move the carriages 16 along the first rail 14. The first motor 22 can be a hydraulic motor, pneumatic motor, electrical motor, or any other type of prime mover. The first conveyor 10 in the illustrated embodiment of FIGS. 1-5 includes a first upstream portion 24 from which brackets 18 (and items carried by the brackets 18) are conveyed, a second descending portion 26 (with respect to a horizontal plane), and a third substantially horizontal portion 28. The illustrated descending portion 26 extends down and to the left in FIGS. 2 and 3 between the first portion 24 and the second portion 28. Accordingly, the first portion 24 is positioned at a greater vertical height from a floor surface than the third portion 28 in the illustrated embodiment.

Figure 1:
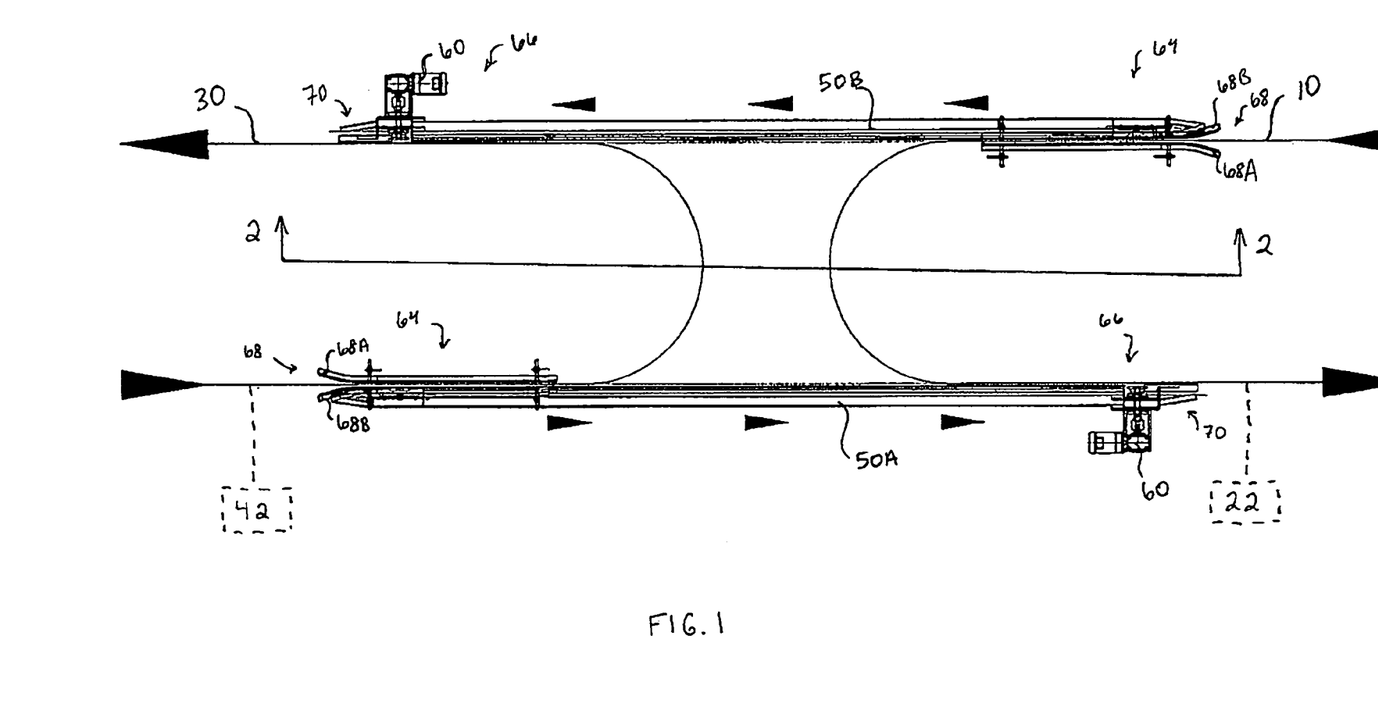
FIG. 1 is a top view of a conveyor system according to an embodiment of the present invention.
Figure 2:
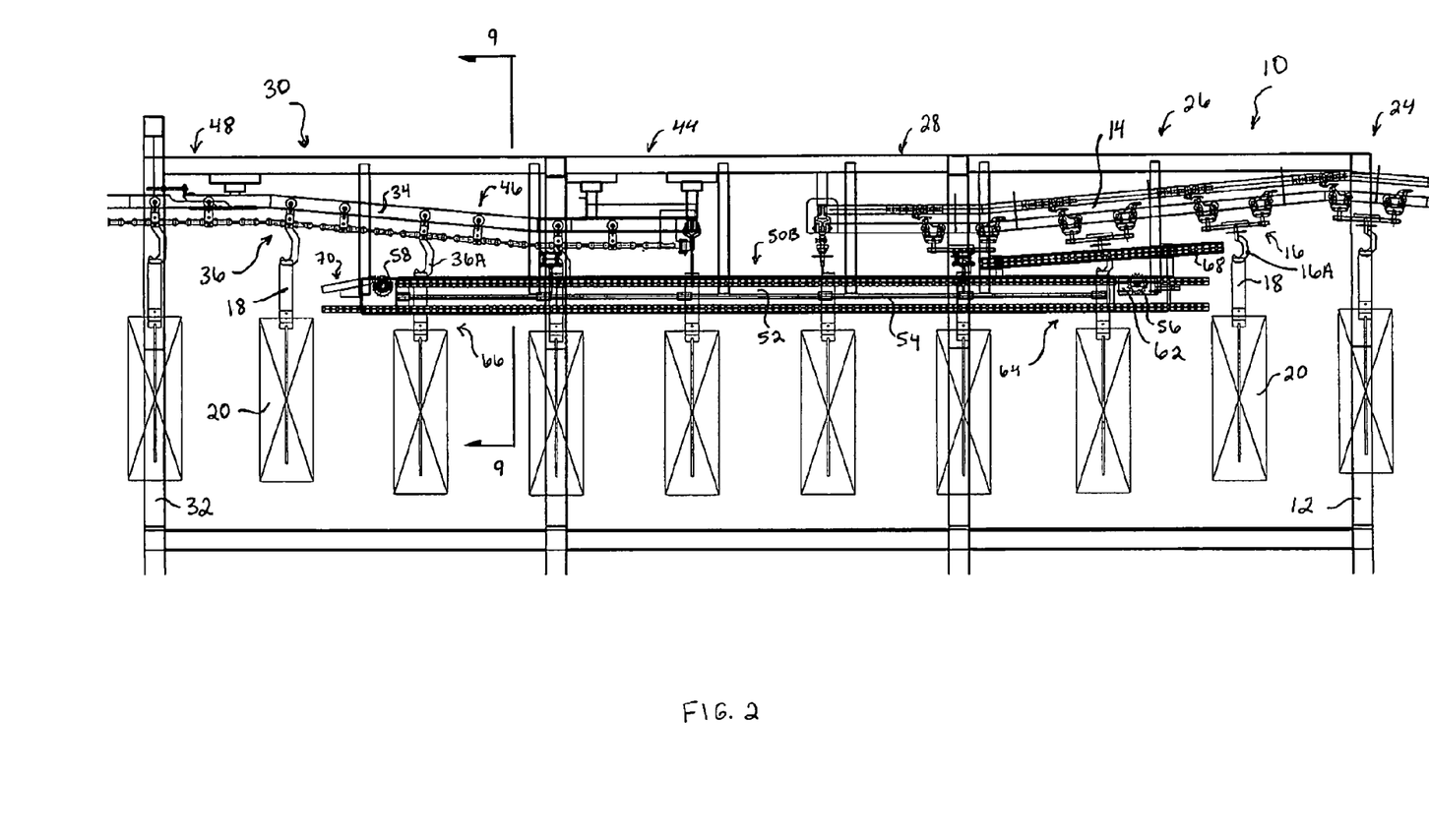
FIG. 2 is a side view of the conveyor system shown in FIG. 1, taken along line 2-2 of FIG. 1.
Figure 3:
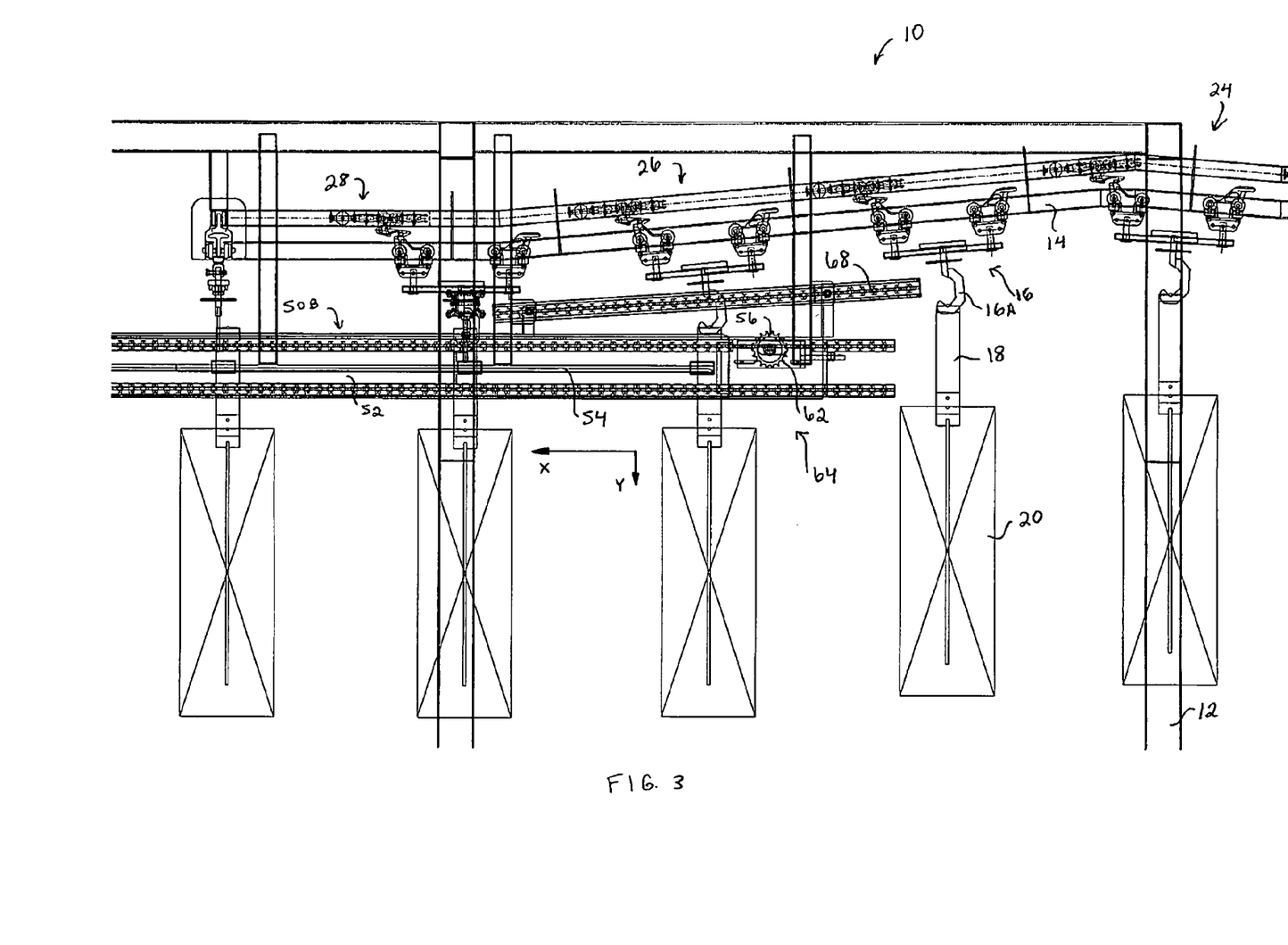
FIG. 3 is a side view of an upstream portion of the conveyor system shown in FIGS. 1 and 2.
Figure 4:
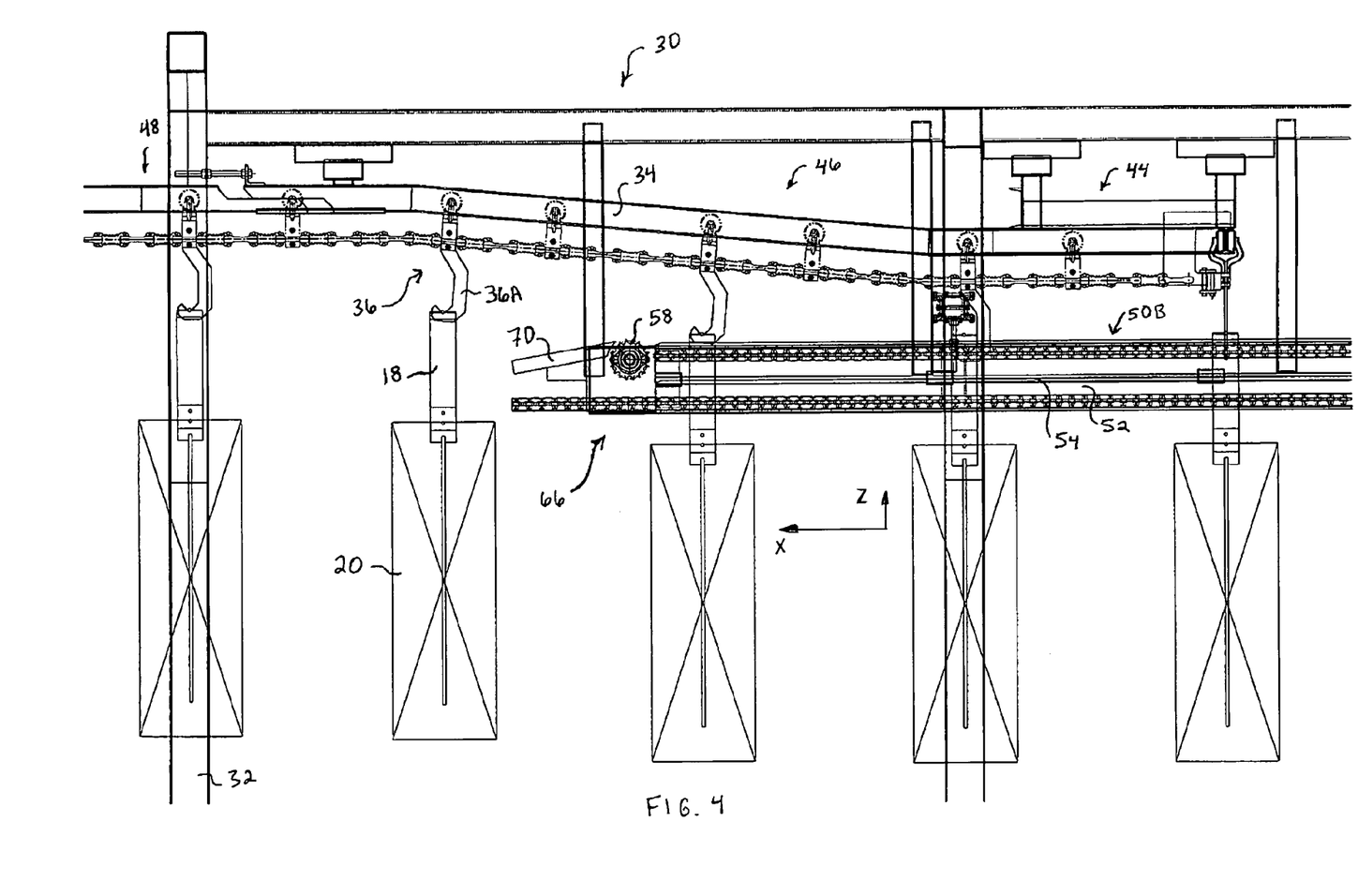
FIG. 4 is a side view of a downstream portion of the conveyor system shown in FIGS. 1-3.

FIGS. 1, 2 and 4 illustrate a second conveyor 30 spaced a distance (e.g., a horizontal distance) from the first conveyor 10. The second conveyor 30 can include a second frame 32 coupled to first frame 12 or defined as a free-standing frame. The illustrated second conveyor 30 further includes a second rail 34 and one or more carriages 36. The carriages 36, like carriages 16, can each include a hook, pin, protrusion, aperture or other portion capable of releasably holding a bracket 18. By way of example only, the illustrated carriages 36 each include a hook 36A. The bracket 18 is operable to support one or more of a variety of items to be conveyed. Again, the illustrated items being conveyed are panels 20 each supported by a bracket 18, which is itself coupled to a respective carriage. A second motor 42 can be coupled to the second conveyor 30 to move the carriages 36 along the second rail 34. Like the first motor, the second motor 42 can be a hydraulic motor, pneumatic motor, electrical motor, or any other type of prime mover. In other embodiments, the first and second motors 22, 42 are replaced by a common motor (not shown) driving both conveyors 10, 30 through suitable mechanical power transmission elements, such as gear boxes, drive shafts, belts and pulleys, chains and sprockets, cables and drums, and the like.

The second conveyor 30 in the illustrated embodiment of FIGS. 1-5 includes a first substantially horizontal portion 44, a second ascending portion 46 (with respect to a horizontal plane), and a third downstream portion 48. The illustrated ascending portion 46 extends up and to the left in FIGS. 2 and 4 between the first portion 44 and the second portion 48. Accordingly, the third portion 48 is positioned at a greater vertical height from a floor surface than the first portion 44 in the illustrated embodiment.

The first and second conveyors 10, 30 illustrated in FIGS. 1-5 each include rails 14, 34 having the cross-sectional shape of an I for receiving wheels on opposite sides of the rail 15, 34 and along which the wheels (and therefore the carriages 16, 36) can move. It should be noted that the first and second conveyors 10, 30 can be of any type desired, including conveyors in which one or more carriages 16, 36 can be slowed, accelerated, stopped, and/or started independently of other carriages 16, 36 on the conveyor 10, 30, and conveyors not having such a capability, conveyors having carriages 16, 36 movable along rails 14, 34 by wheels, glides, rollers, or in any other suitable manner, conveyors suspending each carriage 16, 36 from a single location or from multiple locations along a rail 14, 35, conveyors having rails that are tubular, have a C, U, or inverted U cross-sectional shape along which the carriages 16, 36 move, and the like. Any such conveyor can be used in connection with the present invention. Also, it should be noted that the transfer conveyor 50 (described in more detail below) can provide significant advantages when used in conjunction with conveyors 10, 30 that are of different types, such as an upstream conveyor capable of independent carriage movement and a downstream conveyor incapable of such movement (and vice versa).

FIGS. 1-4 illustrate a transfer conveyor 50 that can be positioned to extend between the first conveyor 10 and the second conveyor 30, thereby permitting transfer of brackets 18 and items 20 from the first conveyor 10 to the second conveyor 30 and/or transfer of brackets 18 and items 20 from the second conveyor 30 to the first conveyor 10. In some embodiments, the transfer conveyor 50 can be installed between existing conveyors 10, 30 or between an existing conveyor 10 or 30 and a new conveyor 30 or 10 to be spliced or otherwise added to the existing conveyor 10 or 30. This installation can be achieved in some applications without the need to modify or significantly modify the existing conveyor.

The illustrated transfer conveyor 50 includes a first transfer conveyor 50A (see FIG. 1), and a second transfer conveyor 50B substantially identical to first transfer conveyor 50A, but oriented in a direction opposite first transfer conveyor 50A. In the illustrated embodiment, the first transfer conveyor 50A facilitates the transfer of brackets 18 and items 20 from the second conveyor 30 to the first conveyor 10, whereas the second transfer conveyor 50B facilitates the transfer of brackets 18 and items 20 from the first conveyor 10 to the second conveyor 30. Since the first and second transfer conveyors 50A, 50B in the illustrated embodiment are substantially identical, only the second transfer conveyor 50B will be discussed in detail herein.

The transfer conveyor 50B can include a rail 52 supported on a dedicated frame 12 or a frame 12, 32 of either or both first and second conveyors 10, 30. The transfer conveyor 50B includes an elongated flexible element 54 that travels around the rail 52. In some embodiments, for example, the elongated flexible element 54 is a roller chain. However, any other type of conveyor element capable of supporting the load of brackets 18 and items 20 as the brackets 18 are moved along the transfer conveyor 50B can be used, and fall within the spirit and scope of the present invention. Such elements include, without limitation, cables, belts, other types of chain, and the like.

With reference again to the illustrated embodiment of FIGS. 1-5, the elongated flexible element 54 is driven by one or more drives through suitable mechanical power transmission elements, such as the illustrated sprockets 56 and 58. In some embodiments, only one of sprockets 56, 58 is a drive sprocket, whereas the other sprocket 58, 56 is an idler sprocket. In other embodiments, both sprockets 56, 58 drive the elongated flexible element 54. In the illustrated embodiment, sprocket 58 is a drive sprocket and sprocket 56 is an idler sprocket. As best shown in FIG. 1, the sprocket 58 is driven by a motor 60. In some embodiments, such as in cases where other types of elongated flexible elements 54 are used, other mechanical power transmission elements can instead be used to drive the transfer conveyor 50B, such as drums, axles, pulleys, and the like.

As described above, the system illustrated in FIGS. 1-5 comprises two transfer conveyors 50A, 50B having substantially the same structure. In some embodiments, transfer conveyor 50A, 50B can be driven by a respective motor 60 (as shown in FIG. 1). However, in other embodiments, both motors 60 can be replaced by a common motor (not shown) driving both transfer conveyors 50A, 50B through suitable mechanical power transmission elements, such as gear boxes, drive shafts, belts and pulleys, chains and sprockets, cables and drums, and the like.

A tension-adjustment mechanism 62 can be provided (e.g., adjacent sprocket 56 in the illustrated embodiment) to permit adjustment of tension in the elongated flexible element 54. The illustrated tension-adjustment mechanism 62 includes a plurality of slots and fasteners permitting movement of the sprocket 56 toward and away from the other sprocket 58.

The illustrated rail 52 of the transfer conveyor 50B extends substantially horizontally, and directs the elongated flexible element 54 along a substantially linear path on a top surface of the transfer rail 52. The elongated flexible element 54 then travels around sprocket 58, and travels in an opposite direction along a bottom surface of the transfer rail 52 toward the other sprocket 56. In other embodiments, the transfer rail 52 can include multiple portions of varying height, and can direct the elongated flexible element 54 along a path in which the elongated flexible element 54 changes in height along the length of the transfer rail 52. Also, in some embodiments the transfer rail 52 and the elongated flexible element is not necessarily straight, and can instead curve laterally to convey brackets 18 and items 20 to different horizontal positions within an environment.

The transfer conveyor 50B includes a upstream end or portion 64 (e.g., adjacent sprocket 56) and a downstream end 66 or portion (e.g., adjacent the other sprocket 58). The upstream end 64 is positioned to receive brackets 18 and items 20 from the first conveyor 10, whereas the downstream end 66 is positioned to dispatch brackets 18 and items 20 to the second conveyor 30. The transfer conveyor 50B can further include one or more funnels or guides to properly orient brackets 18 and/or items 20 as the brackets 18 and items 20 move along the transfer conveyor 50B and/or are transferred between conveyors 10, 50B and 50B, 30. With reference to the illustrated embodiment of FIGS. 1-5 and 9, for example, a first linear guide 68 can be included to vertically orient items as the items are transferred from the first conveyor 10 to the transfer conveyor 50B. The first linear guide 68 in the illustrated embodiment is positioned adjacent the upstream end 64 of the transfer conveyor 50B, and includes inner and outer portions 68A, 68B (see FIG. 1) that extend outward from the elongated flexible element 54 to help center brackets 18 and items 20 with respect to the conveyor 10, and to encourage consistent and accurate transfer of items from the first conveyor 10 to the transfer conveyor 50B. A second linear guide 70 can be included to vertically orient brackets 18 and items 20 as the brackets 18 and items 20 are transferred from the transfer conveyor 50B to the second conveyor 30. The second linear guide 70 can be positioned adjacent the downstream end 66 of the transfer conveyor 50B. The illustrated second linear guide 70 includes an inclined portion positioned vertically above the downstream end 66 of the transfer conveyor 50B.

Figure 9:
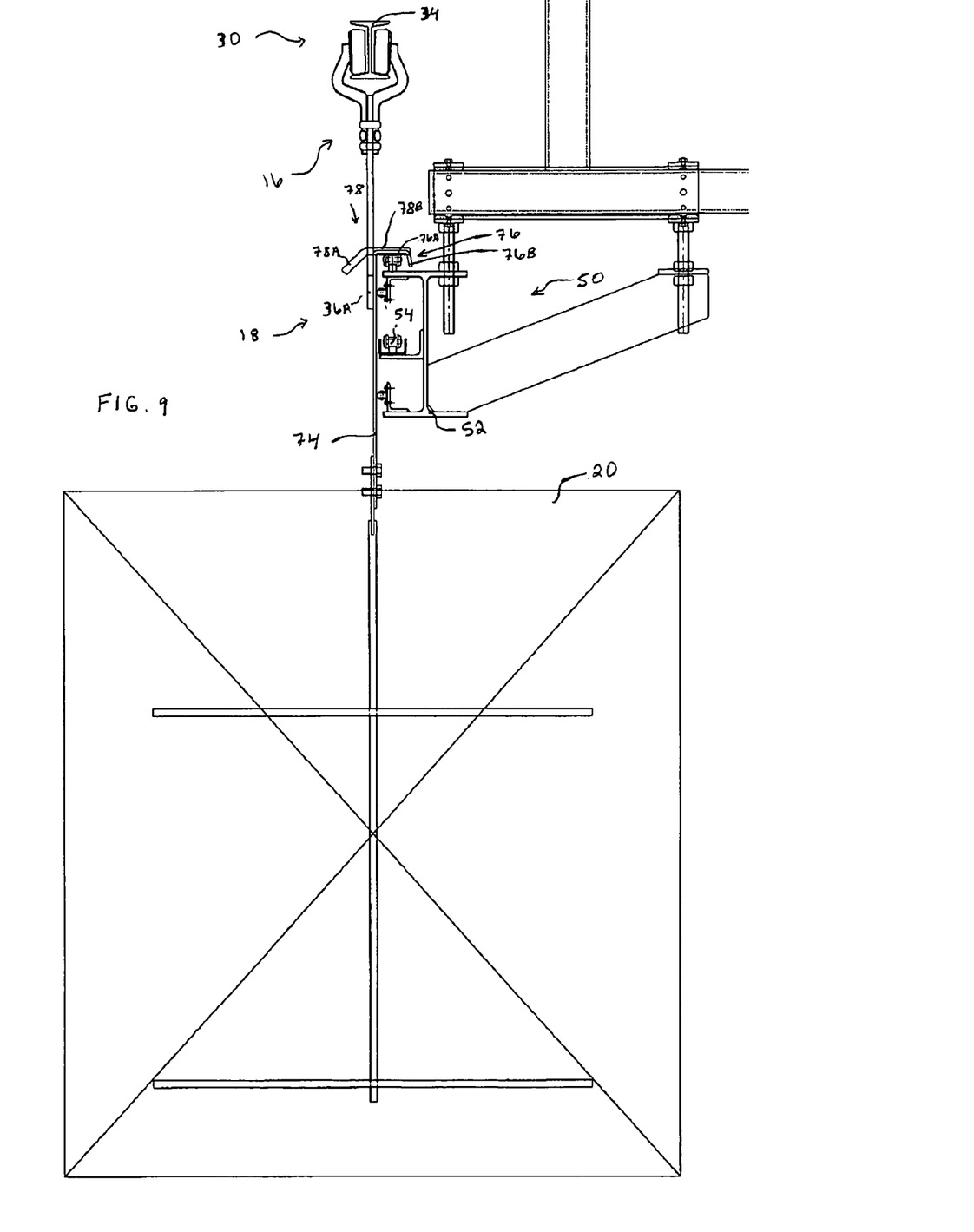
FIG. 9 is a cross-sectional end view of the conveyor system shown in FIGS. 1-5, taken along line 9-9 of FIG. 2.

FIG. 9 illustrates the second conveyor 30 and the transfer conveyor 50. The rail 34 is shown supporting a carriage 36, a bracket 18, and an item 20. The carriage 36 shown in FIG. 9 is coupled to both sides of the rail 34, and the bracket 18 is coupled to the carriage 36 (i.e., supported upon a hook 36A). The bracket 18 can include an elongate portion 74 that extends substantially vertically between the carriage 36 and the item 20. The elongate portion 74 can be primarily straight as shown in FIG. 9, or can take any other shape necessary or desirable to carry one or more items being conveyed.

In the illustrated embodiment, the bracket 18 also includes a portion shaped to be supported upon the transfer conveyor 50, such as an upper hook-shaped portion 76A shaped to extend across part or all of the width of the elongated flexible element 54 of the transfer conveyor 50. Also, the bracket 18 can include another portion 78A shaped to be supported by a carriage 36 of the second conveyor 30 (and/or by a carriage 16 of the first conveyor 10), such as by the hook 36A of a carriage 36 on the second conveyor 30 (and/or by a hook 16A of a carriage 16 on the first conveyor 10). In some embodiments, the portions 76A, 78A are different parts of the same element on the bracket 18, such as different protrusions of a common element on opposite sides of the elongate portion 74. In other embodiments, the portions 76A, 78A are different elements extending from the bracket 18 at different locations along the length of the elongate portion 74. In either case, the portions 76A, 78A can be at horizontally disposed positions with respect to one another, thereby enabling a transfer of the bracket 18 from the first conveyor 10 to the transfer conveyor 50 (and/or from the transfer conveyor 50 to the second conveyor 30) to be made on opposite sides of the bracket 18.

As best shown in FIG. 9, at least one of the portions 76A, 78A of the bracket 18 can extend substantially perpendicularly with respect to the elongate portion 74. Also, in some embodiments, part of at least one of the portions 78A can also be shaped to extend downwardly, thereby encouraging a hook 16A, 36A or other element of the carriage 16, 36 to move to the same position with respect to the bracket 18 each time a carriage 16, 36 is coupled to the bracket 18, and/or encouraging the bracket 18 to move to the same position with respect to the transfer conveyor 50 each time the bracket 18 is supported upon the transfer conveyor 50.

In the illustrated embodiment of FIGS. 1-5 and 9, the elongate portion 74 and a hooked portion 76A has an overall shape similar to an upside-down "J". It should also be noted that the elongate portion 74 can include any number or curves, bends etc. to form an angular, varied or serpentine shape. In some embodiments, the elongate portion 74 includes a plurality of bends to accommodate one or more of the conveyors.

Also with reference to the illustrated embodiment of FIGS. 1-5 and 9, in some embodiments the same element of the bracket 18 can at least partially or fully define both portions 76A, 78A described above. In particular, and with reference to FIG. 9, a crossbar 78 can be coupled to the elongate portion 74 adjacent the hook portion 76A, and can define the first portion 78A and a second portion 78B reinforcing or at least partially defining the J-shaped portion 76A described above.

Although FIG. 9 illustrates the relationship between the bracket 18, the second conveyor 30, and the transfer conveyor 50 as the bracket 18 is being transferred from the transfer conveyor 50 to the second conveyor 30, an identical or similar positional relationship exists between the bracket 18, the first conveyor 10, and the transfer conveyor 50 as the bracket 18 is being transferred from the first conveyor 10 to the transfer conveyor 50.

Figure 10:
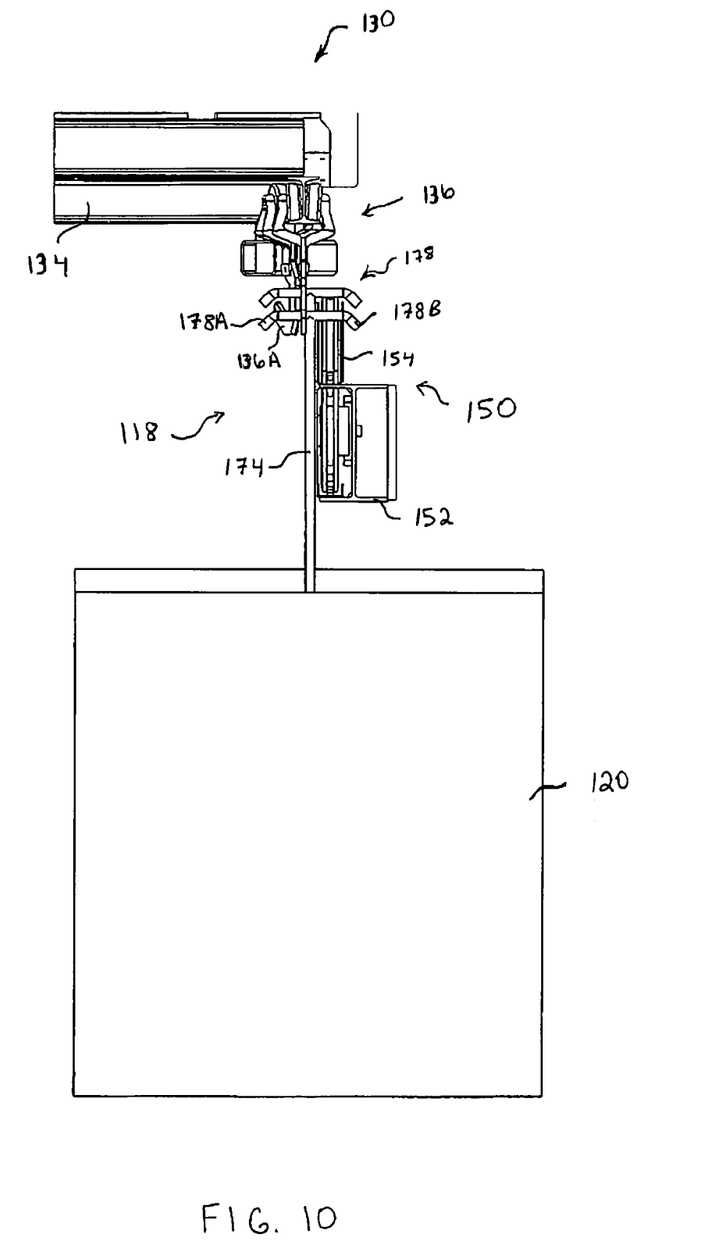
FIG. 10 is cross-sectional end view of the conveyor system shown in FIGS. 6-8, taken along line 10-10 of FIG. 6.

In operation, the first motor 22 moves the carriages 16 of the first conveyor 10 along the first rail 14. The hook 16A of each carriage 16 engages and supports a respective bracket 18 (e.g., at a crossbar portion 78A, 178A, as shown in FIGS. 9 and 10) to support the panel 20 carried upon the bracket 18. The carriages 16 travel along the first portion 24 of the first conveyor 10, down the second descending portion 26, and along the third horizontal portion 28, such that the brackets 18 and panels 20 are lowered toward the upstream end 64 of the transfer conveyor 50B. The first guide 68 aligns the items 20 with the upstream end 64 as the items 20 travel down the second descending portion 26 of the first conveyor 10. The sprocket motor 60 rotates at least one of the sprockets 56, 58 to move the elongated flexible element 54 around the transfer rail 52. As the bracket 18 is lowered along the second descending portion 26, the bracket 18 engages the elongated flexible element 54 (e.g., at a crossbar portion 78B, 178B, as shown in FIGS. 9 and 10), thereby transferring support of the bracket 18 from the carriage 16 to the transfer conveyor 50B by disengaging the hook 16A of the carriage 16 from the crossbar portion 78A, 178A. As the bracket 18 travels along the transfer conveyor 50B, the carriage 16 travels along the third horizontal portion 28. The bracket 18 is then fully supported on the transfer conveyor 50B (at the crossbar portion 78B, 178B), and the elongated flexible element 54 moves the bracket 18 along the transfer conveyor SOB.

Accordingly, the relative vertical movement of the first conveyor 10 (and carriage 16 thereon, and bracket 18 supported therefrom) and the transfer conveyor 50B enables a transfer of the bracket 18 from the first conveyor 10 to the transfer conveyor 50B. The upstream end 64 of the transfer conveyor 50B extends through a range of positions extending in a first direction X common to that of the first conveyor 10, wherein at least some of the range of positions also converges with respect to the first conveyor 10 (e.g., relative movement in a Y direction exists between the first conveyor 10 and the transfer conveyor 50B). The range of positions includes a transfer position at which brackets 18 conveyed by the first conveyor 10 are transferred to the transfer conveyor 50B. In the illustrated embodiment, the X direction is a horizontal direction, whereas the Y direction is a vertical direction.

As the transfer conveyor 50B moves the brackets 18 along the transfer rail 52, the brackets 18 approach the second conveyor 30. The second conveyor 30 includes the carriages 36 that each have a hook 36A and travel along the second rail 34. The second conveyor 30 in the illustrated embodiment includes a first horizontal portion 44 positioned adjacent the transfer conveyor 50B. The hook 36A of a carriage 36 moves into engagement with the bracket 18 (at a crossbar portion 78A, 178A). The carriage 36 moves along the second ascending portion 46 away from the downstream end 66 of the transfer conveyor 50B, thereby transferring support of the bracket 18 from the transfer conveyor 50B to the carriage 36 by engaging and lifting the crossbar portion 78A, 178A of the bracket 18. Therefore, the hook 36A lifts the bracket 18 (at a crossbar portion 78A, 178A) such that the bracket 18 and panel 20 are supported on the second conveyor 30.

The second linear guide 70 inhibits swaying of the brackets 18 and panels 20 after transfer from the transfer conveyor 50B to the second conveyor 30 has taken place. The carriage 36 travels along the downstream portion 48 of the second conveyor 30 and away from the transfer conveyor 50B.

Accordingly, the relative movement of the transfer conveyor 50B (and bracket 18 supported thereon) and the second conveyor 30 enables a transfer of the bracket 18 from the transfer conveyor 50B to the second conveyor 30. The downstream end 66 of the transfer conveyor 50B extends through a range of positions extending in the first direction X common to that of the second conveyor 30, wherein at least some of the range of positions also diverges with respect to the second conveyor 30 (e.g., relative movement in a Z direction exists between the transfer conveyor 50B and the second conveyor 30). The range of positions includes a transfer position at which brackets 18 conveyed by the transfer conveyor 50B are transferred to the second conveyor 30. In the illustrated embodiment, the X direction is a horizontal direction, whereas the Z direction is a vertical direction. In this regard, it should be noted that the X direction need not necessarily be the same for the upstream and downstream portions of the transfer conveyor 50B, although in some embodiments the X direction for the upstream and downstream portions are parallel.

The transfer conveyor 50B in the illustrated embodiment moves along a path at a substantially constant vertical distance from a ground surface, and the first conveyor 10 moves at a variable vertical distance from the ground surface, such that the vertical distance between the first conveyor 10 and the transfer conveyor 50B changes. Also, the transfer conveyor 50B in the illustrated embodiment moves along a path at a substantially constant vertical distance from the ground surface, and the second conveyor 30 moves at a variable vertical distance from the ground surface, such that the vertical distance between the second conveyor 30 and the transfer conveyor 50B is variable. However, as will be described in greater detail below, other orientations of the transfer conveyor 50B and the first and second conveyors 10, 30 can perform the same functions as described above in connection with the illustrated embodiment of FIGS. 1-4 and 9.

FIGS. 5-8 and 10 illustrate another embodiment of a transfer conveyor 150 according to the present invention. This embodiment employs much of the same structure and has many of the same properties as the embodiments of the transfer conveyor 50 described above in connection with FIGS. 1-4. Accordingly, the following description focuses primarily upon structure and features that are different from the embodiments described above in connection with FIGS. 1-4. Reference should be made to the description above in connection with FIGS. 1-4 for additional information regarding the structure and features, and possible alternatives to the structure and features, of the transfer conveyor 150 illustrated in FIGS. 5-8 and described below. Features and elements in the embodiment of FIGS. 5-8 corresponding to features and elements in the embodiments described above in connection with of FIGS. 1-4 are numbered in the 100 series of reference numbers.

Figure 5:
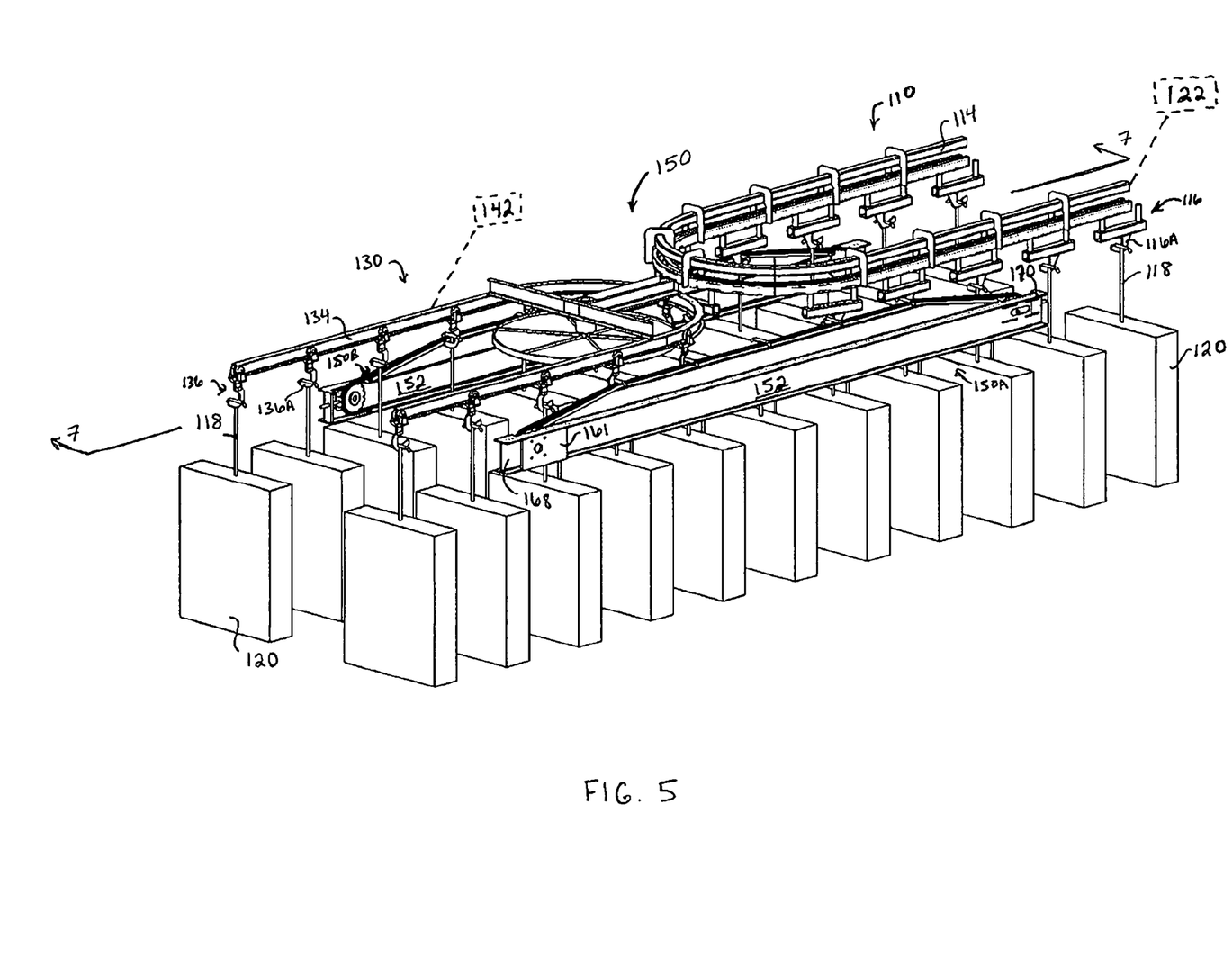
FIG. 5 is a perspective view of a conveyor system according to another embodiment of the present invention.
Figure 6:
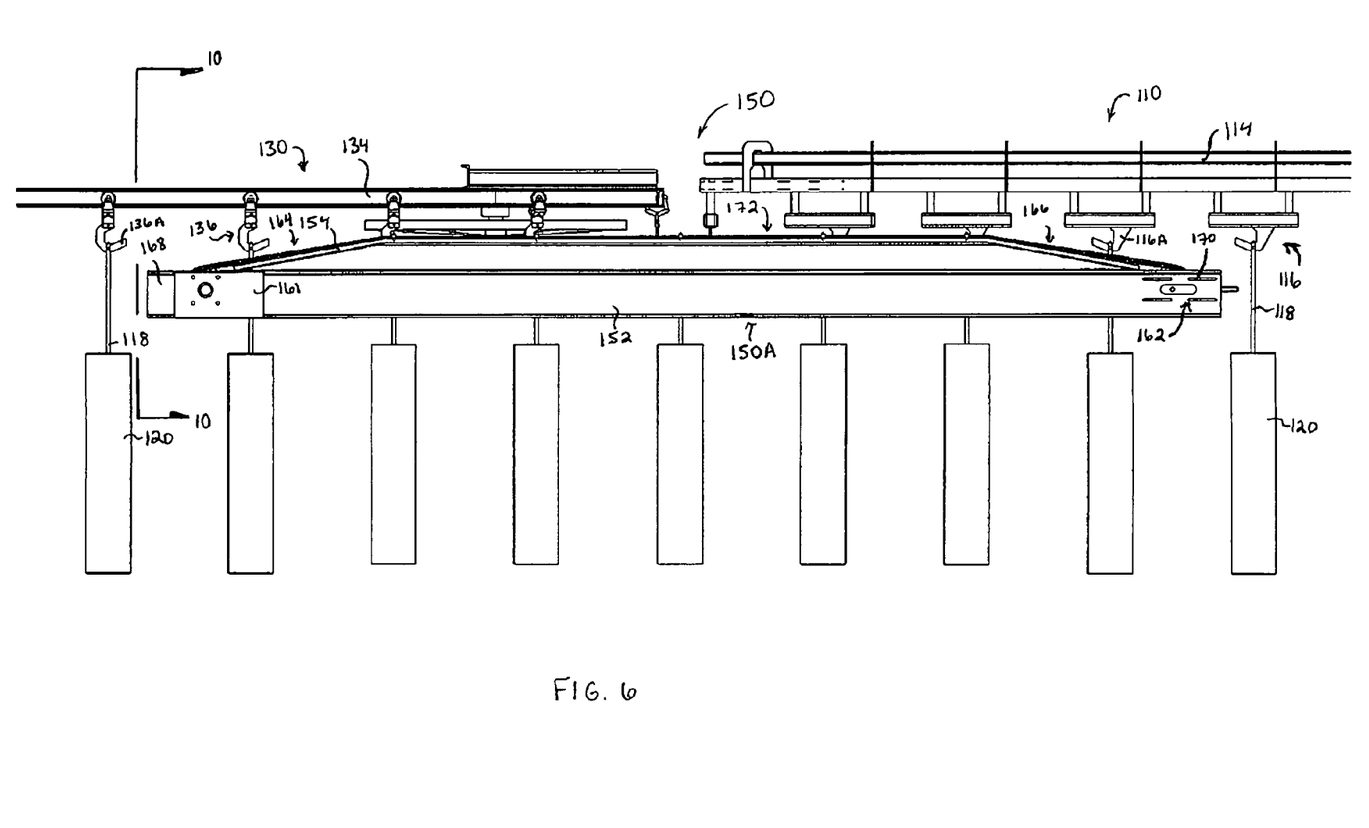
FIG. 6 is a side view of the conveyor system shown in FIG. 5.
Figure 7:
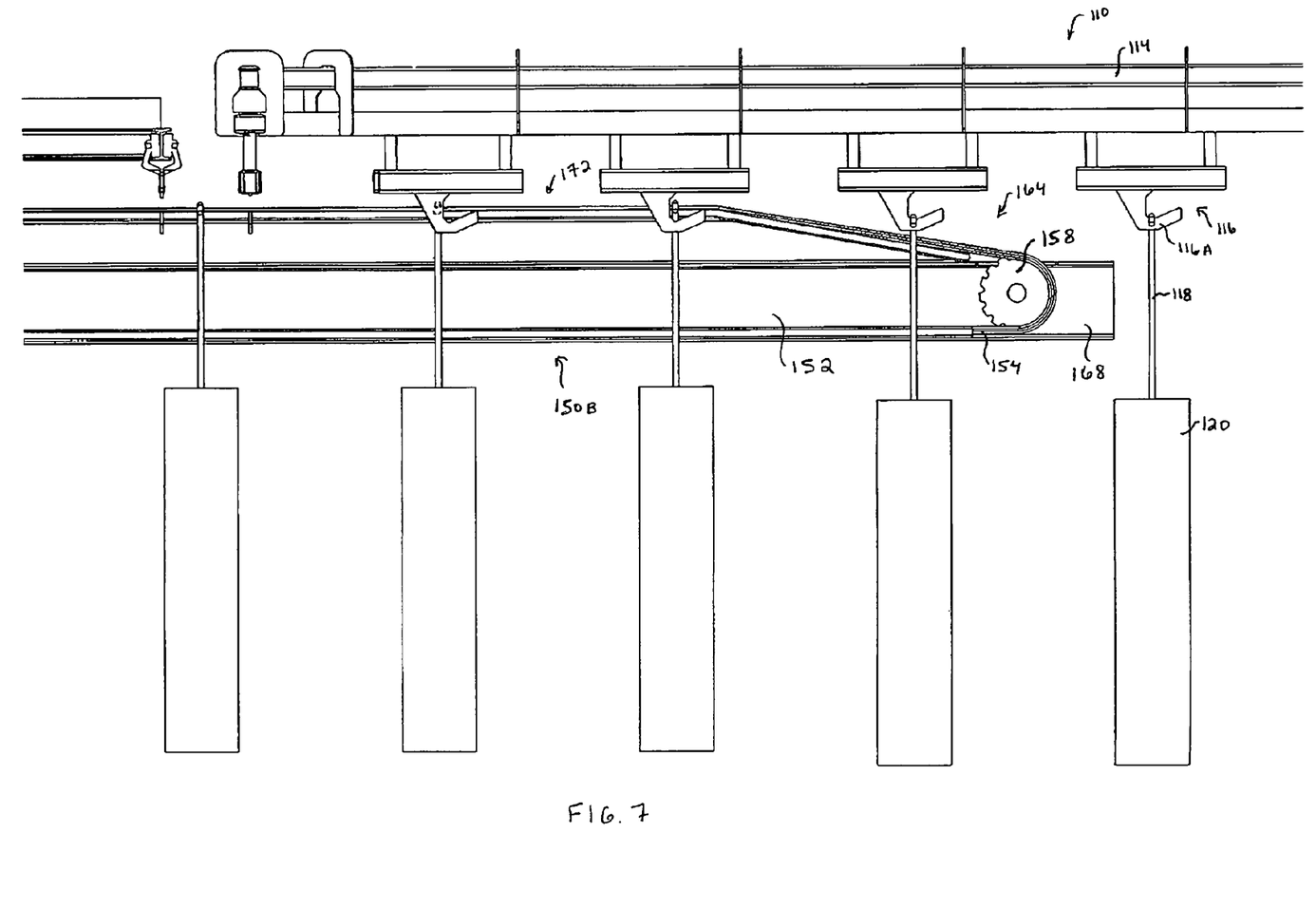
FIG. 7 is a cross-sectional view of the upstream portion of the conveyor system shown in FIGS. 5 and 6, taken along line 7-7 of FIG. 5.

FIGS. 5-7 illustrate a first conveyor 110 including a first frame (not shown), a first rail 114 and a number of carriages 116. The carriages 116 can each include a hook, pin, protrusion, aperture or other portion capable of releasably holding a bracket 118. By way of example only, the illustrated carriages 116 each include a hook 116A. In some embodiments, the hook 116A is similar to hook 16A described above. The bracket 118 is operable to support one or more of a variety of items to be conveyed. The illustrated items being conveyed are boxes 120 each supported by a respective bracket 118, which are themselves each coupled to a respective carriage 116. A first motor 122 can be coupled to the first conveyor 110 to move the carriages 116 along the first rail 114. The first motor 122 can be a hydraulic motor, pneumatic motor, electrical motor, or any other type of prime mover.

The first conveyor 110 of the illustrated embodiment of FIGS. 5-8 and 10 travels along in a substantially horizontal path. Other configurations and travel paths are possible, and are considered to be within the spirit and scope of the present invention.

Figure 8:
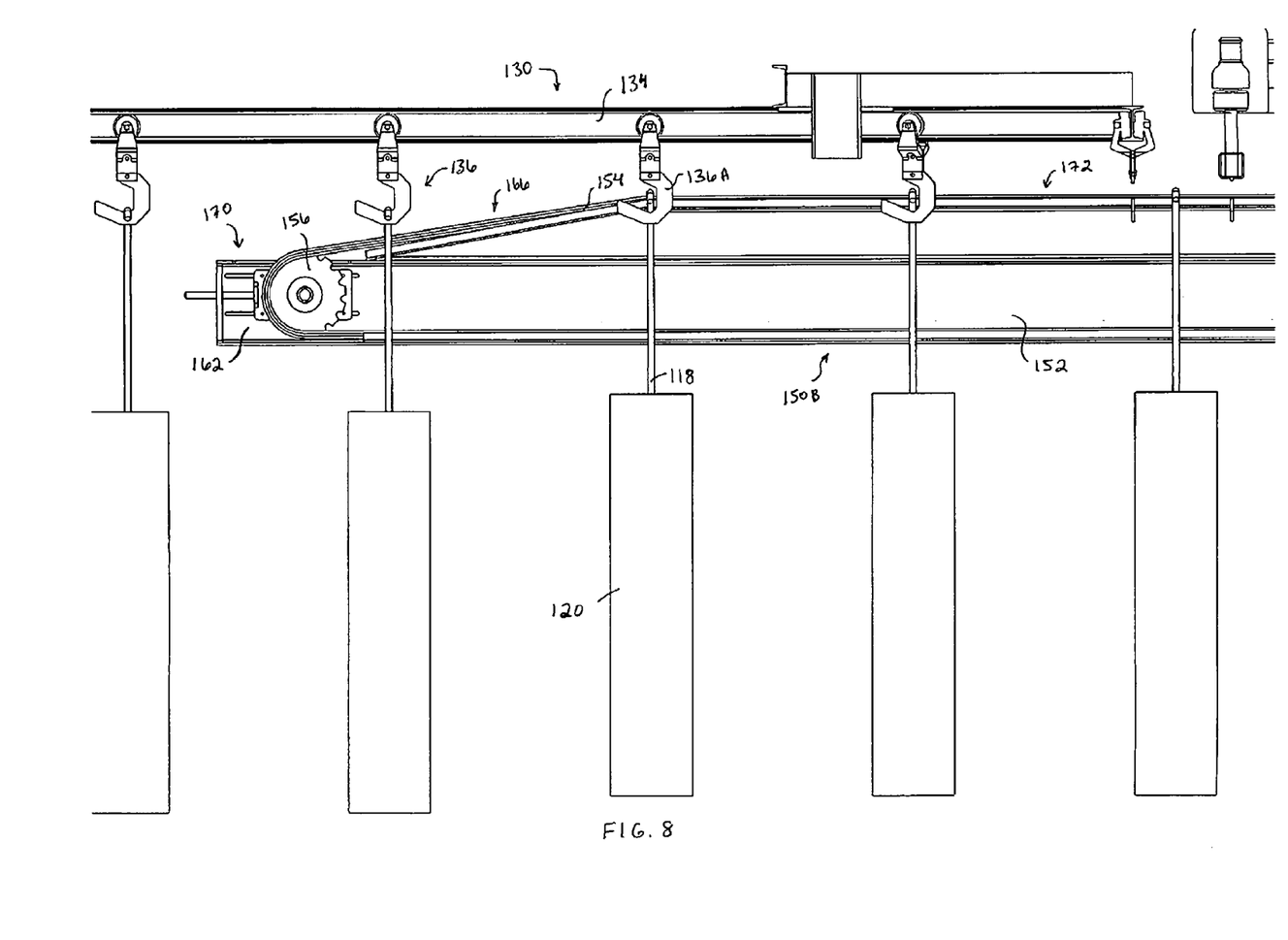
FIG. 8 is a cross-sectional side view of the downstream portion of the conveyor system shown in FIGS. 5-7, taken along line 7-7 of FIG. 5.

FIGS. 5, 6 and 8 illustrate a second conveyor 130 spaced a distance from the first conveyor 110. The second conveyor 130 can include a second frame (not shown), which can be coupled to first frame or can be defined by a free-standing frame. The illustrated second conveyor 130 further includes a second rail 134 and a number of carriages 136. The carriages 136, like carriages 116, can each include a hook, pin, protrusion, aperture or other portion capable of releasably holding a bracket 118. The illustrated carriages 136 each include a hook 136A. In some embodiments, the hook 136A is similar to hook 36A. The bracket 118 is operable to support one or more of a variety of items to be conveyed. Again, the illustrated items being conveyed are boxes 120 each supported by a respective bracket 118, which are themselves each coupled to a respective carriage 116. A second motor 142 can be coupled to the second conveyor 130 to move the carriages 136 along the second rail 134. Like the first motor 122, the second motor 142 can be a hydraulic motor, pneumatic motor, electrical motor, or any other type of prime mover. In other embodiments, the first and second motors 122, 142 are replaced by a common motor (not shown) driving both conveyors 110, 130 through suitable mechanical power transmission elements, such as gear boxes, drive shafts, belts and pulleys, chains and sprockets, cables and drums, and the like.

The second conveyor 130 of the illustrated embodiment of FIGS. 5-8 and 10 travels along a substantially horizontal path.

Other configurations and travel paths are possible, and are considered to be within the scope of the present invention.

FIGS. 5-8 illustrate a transfer conveyor 150 that can be positioned to extend between the first conveyor 110 and the second conveyor 130, thereby permitting transfer of brackets 118 and items 120 from the first conveyor 110 to the second conveyor 130 and/or transfer of brackets 118 and items 120 from the second conveyor 130 to the first conveyor 110. The illustrated transfer conveyor 150 includes a first transfer conveyor 150A, and a second transfer conveyor 150B substantially identical to the first transfer conveyor 150A, but oriented in a direction opposite the first transfer conveyor 150A. In the illustrated embodiment, the first transfer conveyor 150A facilitates the transfer of brackets 118 and items 120 from the second conveyor 130 to the first conveyor 110, whereas the second transfer conveyor 150B facilitates the transfer of brackets 118 and items 120 from the first conveyor 110 to the second conveyor 130. The first and second transfer conveyors 150A, 150B in the illustrated embodiment are substantially identical (the first transfer conveyor 50A is shown in FIG. 6, and the second transfer conveyor 150B is shown in FIGS. 7 and 8). Therefore, description of one of the transfer conveyors 150A, 150B below is applicable to the other transfer conveyor 150B, 150A.

Each transfer conveyor 150A, 150B can include a rail 152 supported on a dedicated frame (not shown) or a frame (also not shown) of either or both first and second conveyors 110, 130. The transfer conveyor 150B includes an elongated flexible element 154 that travels around the rail 152. In some embodiments, for example, the elongated flexible element 154 is a roller chain. However, any other type of conveyor element capable of supporting the load of brackets 118 and items 120 as the brackets 118 are moved along the transfer conveyor 150B can be used, and fall within the spirit and scope of the present invention. Such elements include, without limitation, cables, belts, other types of chain, and the like.

With reference again to the illustrated embodiment of FIGS. 1-5, the elongated flexible element 154 is driven by one or more drives through suitable mechanical power transmission elements, such as the illustrated sprockets 156 and 158. In some embodiments, only one of sprockets 156, 158 is a drive sprocket, whereas the other sprocket 158, 156 is an idler sprocket. In other embodiments, both sprockets 156, 158 drive the elongated flexible element 154. In the illustrated embodiment, sprocket 158 is a drive sprocket and sprocket 156 is an idler sprocket. As best shown in FIGS. 5 and 6, the sprocket 158 is driven by a motor (supported on motor support plate 161). In some embodiments, such as in cases where other types of elongated flexible elements 154 are used, other mechanical power transmission elements can instead be used to drive the transfer conveyor 150B, such as drums, axles, pulleys, and the like.

A tension-adjustment mechanism 162 can be provided (e.g., adjacent sprocket 156 in the illustrated embodiment) to permit adjustment of tension in the elongated flexible element 154. The illustrated tension-adjustment mechanism 162 includes a plurality of slots and fasteners permitting movement of sprocket 156 toward and away from the other sprocket 158.

The illustrated transfer rail 152 of the embodiment of FIGS. 5-8 and 10 extends substantially horizontally, and directs the elongated flexible element 154 along a vertically changing path on a top surface of the transfer rail 152. The elongated flexible element 154 then travels around the sprocket 156, and travels in an opposite direction along a bottom surface of the transfer rail 152 toward the other sprocket 158.

With continued reference to the illustrated embodiment of FIGS. 5-8 and 10, the transfer conveyor 150B includes an upstream end 164 (e.g., adjacent sprocket 158) and a downstream end 166 (e.g., adjacent sprocket 156). The upstream end 164 is positioned to receive brackets 118 and items 120 from the first conveyor 110, whereas the downstream end 166 is positioned to dispatch brackets 118 and items 120 to the second conveyor 130. In the illustrated embodiment of FIGS. 5-8 and 10, the upstream end 164 is inclined upward and to the left (viewed in FIG. 7), and the downstream end 166 is inclined downward and to the left (viewed in FIG. 8). An intermediate portion 172 of the transfer conveyor 150B extends between the upstream end 164 and the downstream end 166. The illustrated intermediate portion 172 is substantially horizontal, and is located vertically above the sprockets 156, 158.

In FIG. 6, the transfer conveyor 150A is positioned to that the upstream end 164 of the transfer conveyor 150A receives items 120 from the second conveyor 130, and the downstream end 166 dispatches items 120 to the first conveyor 110. The upstream end 164 is inclined upward and to the right (viewed in FIG. 6), and the downstream end 166 is inclined downward and to the right (again, viewed in FIG. 6). An intermediate portion 172 of the transfer conveyor 150A extends between the upstream end 164 and the downstream end 166. The illustrated intermediate portion 172 is substantially horizontal, and is located vertically above the motor support 161 and the tension-adjustment mechanism 162.

The transfer conveyor 150B can further include one or more funnels or guides to properly orient brackets 118 and/or items 120 as the brackets 118 and items 120 move along the transfer conveyor 150B and/or are transferred between conveyors 110, 150B and 150B, 130. With reference to the illustrated embodiment of FIGS. 5-8 and 10, for example, a first linear guide 168 can be included to vertically orient items as the items are transferred from the first conveyor 110 to the transfer conveyor 150B. The first linear guide 168 in the illustrated embodiment is positioned adjacent the upstream end 164 of the transfer conveyor 150B, and includes an extension of the rail 152 to encourage consistent and accurate transfer of items from the first conveyor 110 to the transfer conveyor 150B. A second linear guide 170 can be included to vertically orient brackets 118 and items 120 as the brackets 118 and items 120 are transferred from the transfer conveyor 150B to the second conveyor 130. The second linear guide 170 can be positioned adjacent the downstream end 166 of the transfer conveyor 150B. The illustrated second linear guide 170 includes an extension of the rail 152 to limit swaying of items 120 after being transferred from the transfer conveyor 150B to the second conveyor 130.

FIG. 10 illustrates the second conveyor 130 and the transfer conveyor 150. A rail 134 supports a carriage 136, a bracket 118 and an item 120. The carriage 136 in the illustrated embodiment is coupled to both sides of the rail 134, and the bracket 118 is coupled to the carriage 136 (i.e., supported upon a hook 136A of the carriage 136). The bracket 118 is supported on the elongated flexible element 154 of the transfer conveyor 150. FIG. 10 illustrates two brackets 118—one in front of and therefore mostly hiding the other in the view of FIG. 10. Accordingly, one of the brackets 118 (a crossbar 178 of which is visible in FIG. 10) is further along the transfer conveyor 150 and is further up an incline of the transfer conveyor 150 than the other.

The brackets 118 illustrated in the embodiment of FIGS. 5-8 and 10 are different than those 18 shown in the first illustrated embodiment described above. However, it should be noted that the brackets 18, 118 can be interchangeable in different embodiments of the present invention.

Like the bracket 18 described above in connection with the first illustrated embodiment, the bracket 118 in the embodiment of FIGS. 5-8 and 10 can include an elongate portion 174 that extends between the carriage 136 and the item 120. The illustrated elongate portion 174 is substantially straight. However, the elongate portion 174 can include any number or curves, bends etc. to form an angular, varied or serpentine shape. In some embodiments, the elongate portion 174 includes a plurality of bends to accommodate one or more of the conveyors.

The bracket 118 illustrated in the embodiment of FIGS. 5-8 and 10 includes a crossbar 178 coupled to the elongate portion 174 at a suitable position along the elongate portion 174. The illustrated crossbar 178 extends substantially perpendicular to the elongate portion 174, although other relative positions and orientations of the crossbar 178 with respect to the elongate portion 174 are possible. The crossbar 178 can include a first portion 178A and a second portion 178B protruding in different directions with respect to the elongate portion 174. In the illustrated embodiment, part of the first portion 178A extends downward at an angle with respect to the crossbar 178, whereas part of the second portion 178B extends downward at an angle with respect to the crossbar 178. Also in the illustrated embodiment, the second portion 178B is a substantial mirror image of the first portion 178A.

The first portion 178A can be used to couple the crossbar 178 to a hook portion 136A of a carriage 136, and can inhibit the crossbar 178 from sliding off the hook portion 136A. The second portion 178B can couple the crossbar 178 to the transfer conveyor 150, and can inhibit the crossbar 178 from sliding off the transfer conveyor 150.

In some embodiments, the first portion 178A and the second portion 178B are positioned on the same side of the elongate portion 174. In other embodiments, the first portion 178A and the second portion 178B extend at different angles or for different lengths. Also, in some embodiments, the first portion 178A and the second portion 178B form different shapes. Finally, in some embodiments, only one portion 178A, 178B is provided, such that the same portion 178A, 178B performs at least some of the same functions of the first portion 178A and the second portion 178B described herein.

Although FIG. 10 illustrates the relationship between the bracket 118, the second conveyor 130, and the transfer conveyor 150 as the bracket 118 is being transferred from the transfer conveyor 150 to the second conveyor 130, an identical or similar positional relationship exists between the bracket 118, the first conveyor 110, and the transfer conveyor 150 as the bracket 118 is being transferred from the first conveyor 110 to the transfer conveyor 150.

The embodiment illustrated in FIGS. 5-8 and 10 operates in a similar manner as the embodiment illustrated in FIGS. 1-4 and 9. Therefore, only those aspects of the embodiment illustrated in FIGS. 5-8 and 10 that differ significantly from that of FIGS. 1-4 and 9 will be described.

The embodiment illustrated in FIGS. 5-8 and 10 differs from the embodiment illustrated in FIGS. 1-4 and 9 in that the first conveyor 110 and the second conveyor 130 both travel through paths having a substantially constant elevation. The path traveled by the first conveyor 110 can be at the same or a different height with respect to that of the second conveyor 130. Also, the transfer conveyor 150B travels through a path having a changing elevation. For example, the first conveyor 10 is substantially horizontal, while the upstream end 164 of the transfer conveyor 150B is inclined upward to engage approaching brackets 118. As described above, the hooks 136A support the brackets 118 at one of the crossbar portions 78A, 178A, and the elongated flexible element 154 can engage one of the crossbar portions 78B, 178B. The elongate flexible element 154 raises approaching brackets 118 to a height higher than that of the first conveyor 110 to disengage the bracket 118 from the first conveyor 110. The hooks 116A move along the first conveyor away from the brackets 118.

The transfer conveyor 150B carries the bracket 118 along from the upstream end 164 toward the downstream end 166 in a substantially horizontal path, and then is a downward direction at the downstream end 166 of the transfer conveyor 150B. The transfer conveyor 150B thereby lowers the bracket 118 and box 120 to permit hooks 136A to engage crossbar portions 78A, 178A of the approaching brackets 118. The second conveyor 130 travels along a substantially horizontal path as the transfer conveyor 150B travels a descending path to transfer the brackets 118 from the transfer conveyor 150B to the second conveyor 130.

In the two illustrated embodiments described above, transfer from an upstream conveyor 10, 110 to a transfer conveyor 50, 150 is enabled by a convergence of the upstream and transfer conveyors 10, 110 and 50, 150, whereas transfer from the transfer conveyor 50, 150 to a downstream conveyor 30, 130 is enabled by a divergence of the transfer conveyor 50, 150 and the downstream conveyor 30, 130. In the illustrated embodiment of FIGS. 1-4 and 9, this is accomplished by a substantially horizontal transfer conveyor 50 extending between a declined upstream conveyor and an inclined downstream conveyors (with reference to the direction of bracket and item movement through the system). In the illustrated embodiment of FIGS. 5-8 and 10, this is instead accomplished by a transfer conveyor 150 having an inclined upstream end 164 and a declined downstream end 166 extending between substantially horizontal upstream and downstream conveyors 110, 130. It will be appreciated that the convergence and divergence of conveyors 10, 30, 50 and 110, 130, 150 to facilitate bracket transfer in both embodiments can be achieved with conveyors 10, 110, 30, 130, 50, 150 having other relative orientations that still having convergence in an upstream portion of the transfer conveyor 50, 150 and divergence in a downstream portion of the transfer conveyor 50, 150.

By way of example only, in other embodiments, the upstream portion of the transfer conveyor 50, 150 can be inclined in the direction of bracket movement and the upstream conveyor 10, 110 can be declined in the direction of bracket movement. Also or alternatively, the downstream portion of the transfer conveyor 50, 150 can be declined in the direction of bracket movement and the downstream conveyor 30, 130 can be inclined in the direction of bracket movement. In other embodiments, both the upstream portion of the transfer conveyor 50, 150 and the upstream conveyor 10, 110 can be inclined or declined in the direction of product movement so long as both conveyors 50, 150, 10, 110 converge with respect to one another at or proximate the upstream portion of the transfer conveyor 50, 150. Similarly, both the downstream portion of the transfer conveyor 50, 150 and the downstream conveyor 30, 130 can be inclined or declined in the direction of product movement so long as both conveyors 50, 150, 30, 130 diverge with respect to one another at or proximate the downstream portion of the transfer conveyor 50, 150. Any combination of inclined and declined upstream and downstream conveyors 10, 110, 30, 130 and upstream and downstream portions of the transfer conveyor 50, 150 providing this converging and diverging relationship can be utilized, and falls within the spirit and scope of the present invention.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims.

For example, although both illustrated embodiments show two transfer mechanisms 50A, 50B and 150A, 150B between first and second conveyors 10, 30 and 110, 130 (particularly useful for moving items to and through the second conveyor 30, 130 and back to the first conveyor 10, 110), it will be appreciated that in other embodiments, only one transfer mechanism 50A, 50B, 150A, 150B is used to transfer brackets 18, 118 and items 20, 120 between conveyors 10, 30, 110, 130.

Various features and advantages of the invention are set forth in the following claims.

What is claimed is:

1. A transfer mechanism operable for transferring items from a first conveyor to a second conveyor, the transfer mechanism comprising:
    a third conveyor extending from a location adjacent the first conveyor to a location adjacent the second conveyor, the third conveyor having
        an upstream portion extending through a first range of positions extending in a first direction common to that of the first conveyor, at least some of the first range of positions also converging with respect to the first conveyor, the first range of positions including a first transfer position at which items conveyed by the first conveyor are transferred to the third conveyor by removal of the item from a carriage of the first conveyor solely by the convergence; and
        a downstream portion extending through a second range of positions extending in a second direction common to that of the second conveyor, at least some of the second range of positions also diverging with respect to the second conveyor, the second range of positions including a second transfer position at which items conveyed by the third conveyor are transferred to the second conveyor solely by the divergence; and
    a motor coupled to the third conveyor to move the third conveyor.

2. The transfer mechanism of claim 1, wherein the first and second directions are substantially parallel with respect to one another.

3. The transfer mechanism of claim 1, wherein the first and second directions are substantially horizontal.

4. The transfer mechanism of claim 1, wherein the third conveyor further comprises a rail extending between the upstream and downstream portions.

5. The transfer mechanism of claim 4, wherein the third conveyor further comprises a movable chain extending along and supported by the rail, and driven by the motor.

6. The transfer mechanism of claim 1, wherein movement of the third conveyor through the first range of positions includes a vertical component.

7. The transfer mechanism of claim 1, wherein movement of the third conveyor through the first range of positions is substantially horizontal.

8. A conveyor system comprising:
    a first conveyor comprising a first rail and a first carriage coupled to the first rail for movement along the first rail;
    a second conveyor horizontally spaced from the first conveyor, the second conveyor comprising a second rail and a second carriage coupled to the second rail for movement along the second rail;
    a bracket adapted to support at least one item, the bracket movable along and supported by either of the first and second carriages of the first and second conveyors; and
    a third conveyor extending between the first and second conveyors, the third conveyor comprising a first portion extending adjacent and along a first path of the bracket moved by the first conveyor, and a second portion extending adjacent and along a second path of the bracket moved by the second conveyor, wherein the first path vertically converges with respect to the third conveyor for transfer of the bracket off the first carriage and onto the third conveyor solely by the vertical convergence and the second path vertically diverges with respect to the third conveyor for transfer of the bracket off the third conveyor and onto the second carriage solely by the vertical divergence.

9. The conveyor system of claim 8, wherein at least one of the carriages comprises a hook.

10. The conveyor system of claim 8, wherein the bracket comprises a first portion carried by the carriage of the first conveyor, and a second portion carried by the third conveyor.

11. The conveyor system of claim 10, wherein the first portion is horizontally disposed from the second portion of the bracket.

12. The conveyor system of claim 8, wherein the bracket comprises a first projection upon which the bracket is supported by the first conveyor, the first projection extending laterally and in a downward direction.

13. The conveyor system of claim 12, wherein the bracket further comprises a second projection upon which the bracket is supported by the third conveyor, at least a portion of the second projection extending laterally.

14. The conveyor system of claim 8, wherein the third conveyor further comprises a chain upon which the bracket is supported and moved between the first and second conveyors.

15. A method of transferring at least one item from a first conveyor to a second conveyor, the method comprising:
    moving an item along a first conveyor with a carriage associated with the first conveyor toward a third conveyor;
    converging a portion of the first conveyor and an upstream portion of the third conveyor by changing elevation of at least one of the portion of the first conveyor and the upstream portion of the third conveyors;
    transferring the item from the carriage of the first conveyor to the third conveyor solely by the convergence;
    conveying the first carriage along the first conveyor, without the item, downstream of the converging portion of the first conveyor;
    moving the item along the third conveyor;
    diverging a portion of the second conveyor and a downstream portion of the third conveyor by changing elevation of at least one of the portion of the second conveyor and the downstream portion of the third conveyor to transfer the item from the third conveyor to a carriage associated with the second conveyor solely by the divergence; and
    moving the item along the second conveyor.

16. The method of claim 15, wherein converging the portion of the first conveyor and the upstream portion of the third conveyor comprises vertically converging the portion of the first conveyor and the upstream portion of the third conveyor.

17. The method of claim 15, wherein diverging the portion of the second conveyor and the downstream portion of the third conveyor comprises vertically diverging the portion of the second conveyor and the downstream portion of the third conveyor.

18. The method of claim 15, further comprising releasably coupling a bracket supporting an item to the first conveyor for movement along the first conveyor.

19. The method of claim 18, wherein transferring the item comprises releasing a first portion of the bracket from the first conveyor and releasably coupling a second portion of the bracket to the third conveyor.

20. The method of claim 19, further transferring the item comprises releasing the second portion of the bracket from the third conveyor and releasably coupling the first portion of the bracket to the second conveyor.

* * * * *

UNITED STATES PATENT AND TRADEMARK OFFICE
CERTIFICATE OF CORRECTION

PATENT NO. : 8,505,712 B2
APPLICATION NO. : 12/933998
DATED : August 13, 2013
INVENTOR(S) : Andreae et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 33 days.

Signed and Sealed this
Fifteenth Day of September, 2015

Michelle K. Lee
*Director of the United States Patent and Trademark Office*